United States Patent [19]

Marks

[11] E Patent Number: Re. 33,487

[45] Reissued Date of Patent: Dec. 11, 1990

[54] WATER TREATMENT AND SOIL TESTING

[75] Inventor: Colin E. Marks, Ryton, England

[73] Assignee: Palintest Limited, Gateshead, England

[21] Appl. No.: 404,853

[22] Filed: Sep. 8, 1989

Related U.S. Patent Documents

Reissue of:

[64] Patent No.: 4,775,513
Issued: Oct. 4, 1988
Appl. No.: 421,964
Filed: Mar. 5, 1987

[30] Foreign Application Priority Data

Mar. 12, 1986 [GB] United Kingdom ..... 8606073

[51] Int. Cl.[5] ..... G01N 33/24

[52] U.S. Cl. ..... 422/61; 210/282; 422/101; 436/79; 436/80; 436/84; 436/103; 436/116

[58] Field of Search ..... 210/266, 282; 422/61, 422/101; 436/79, 80, 84, 103, 116

[56] References Cited

U.S. PATENT DOCUMENTS

| | | | |
|---|---|---|---|
| 2,781,312 | 2/1957 | Klumb et al. | 210/282 |
| 3,223,619 | 12/1965 | Calmon et al. | 210/282 |
| 3,224,586 | 12/1965 | Wade | 210/282 |
| 3,572,997 | 3/1971 | Burk | 422/61 |
| 4,303,610 | 12/1981 | Sardisco et al. | 422/61 |
| 4,443,336 | 4/1984 | Bennethum | 210/282 |

*Primary Examiner*—Ivars Cintins
*Attorney, Agent, or Firm*—Rodman & Rodman

[57] ABSTRACT

A device for treating water to reduce the concentration of cations or anions therein includes a water-tight container (4) of flexible material, designed to be able to lie substantially flat (FIG. 3) when empty and having an aperture (5) for the introduction of liquid, a strainer (7) extending across the aperture, and a closure (6) for the aperture, and a quantity of ion-exchange material (b 8) occupying a minor proportion of the available interior volume of the container. A soil extraction outfit and a soil testing outfit are described, which incorporate the water treatment device.

11 Claims, 1 Drawing Sheet

WATER TREATMENT AND SOIL TESTING

Matter enclosed in heavy brackets [ ] appears in the original patent but forms no part of this reissue specification; matter printed in italics indicates the additions made by reissue.

The present invention is concerned with the production of deionised water and also with the testing of soils, which latter operation requires a quantity of deionised water.

Deionized water is required for many purposes, both domestic and industrial, often in situations where a supply is not readily available. Thus it may be used for filling steam irons, for which purpose it may be regarded as acceptable to store a quantity in the home, but equally it may be needed in an emergency for topping-up an electric battery, for example a car battery, or a quantity may be required "in the field" for carrying out soil testing. It may be possible to carry a quantity of deionised water for such purposes but water is rather a bulky product to carry in quantity.

The expression "deionised water" is widely used, in particular in the foregoing contexts, and means water in which the concentration of cations or anions or both has been significantly reduced compared with the concentration of the corresponding ion or ions in water before it has been treated for this purposes. Thus the quoted expression does not imply the complete removal of all ions but simply their reduction to an acceptable concentration for the intended use. The expression, in its normal meaning, includes so-called "demineralised" water, "desalinated" water and "softened" water.

It is an object of the present invention to make it possible to provide quantities of deionised water in situ from available ion-containing water, with the maximum of convenience to the user.

The present invention is a device for the treatment of water which comprises a water-tight container of flexible material, designed to be able to lie substantially flat when empty and having an aperture for the introduction of liquid, strainer means extending across said aperture and a closure for said aperture, and a quantity of ion-exchange material occupying a minor proportion of the available interior volume of the container.

By means of the aforesaid device, it is possible to produce in situ quantities of deionised water amounting to a multiple of the volume of the device itself, while the device in turn may readily be made in a highly compact form.

The water-tight container may conveniently be in the form of a flat bag, with the liquid aperture being, for example, at one end thereof or, less desirably, in one of the flat faces thereof. In one alternative form, the water-tight container is a vertically-collapsible, generally cylindrical bottle. Thus the container may be made from a flexible film of synthetic plastics material, for example of polyethylene, a polyester or nylon.

An important characteristic of the container, as indicated, is that is should be so designed as to be able to lie substantially flat when it is empdy, with the advantage that it may be folded, rolled or otherwise put into a very compact form as desired. Thus its volume for storage or transport purposes may be little more than that of its contents at the time but its available volume may be much more than that, for example a multiple of its folded or collapsed volume.

The liquid aperture may conveniently be defined by a neck or spout, which may be formed integral with the container or formed separately and subsequently bonded to it. Such a neck or spout may be formed in a synthetic plastics material, for example polyethylene.

The liquid aperture is provided with a closure, to prevent loss of the liquid contents of the container. The closure preferably takes the form of a snap-on cap, which may advantageously be attached to the container to prevent the cap being mislaid. The closure may be manufactured from a synthetic plastics material, which may be the same as that of the neck or spout, for example polyethylene.

Across the aperture, for example lying within a neck or spout, a strainer means is located, in order to retain the solid material within the container when its liquid contents are poured from it. The strainer may be a flat mesh or perforated plate, for example of metal, especially a corrosion-resistant metal, or of synthetic plastics material. As an alternative, the strainer may be a plug, for example of fibrous or filamentary material such as glass wool or cotton wool or of a porous foamed material. A preferred strainer comprises a cylindrical plug of knitted stainless steel wire, of which the metal-to-free-space volume ratio lies between 40:60 and 10:90.

Within the flexible container is a quantity of ion-exchange material. The specific chemical nature of the material will be selected depending upon the quantity and nature of the available untreated water and upon the quality and characteristics of the deionised water required to be produced. A variety of such ion-exchange materials are available. For example, various naturally-occuring materials such as silicates and certain clays possess ion-exchange properties and may be used as the ion-exchange material in the present invention.

In a preferred form of the invention, the ion-exchange material is a synthetic resin or mixture of such resins. Such ion-exchange resins typically are high-molecular-weight polymers derived from, for example, styrene, formaldehyde or phenol and having within the molecular lattice ionic groups which determine the ion-exchanging properties of the resin. For example, resins containing acid groups, such as sulphonic acid groups or carboxyl groups, possess cation-exchanging properties while resins containing basic groups, such as quaternary ammonium groups or amino groups, possess anion-exchanging properties.

Resins containing a mixture of one or more of both acidic and basic types, commonly referred to as mixed-bed resins, are effective in exchanging both cations and anions. Thus in a typical treatment of water with a mixed-bed resin, cations such as those of sodium, potassium, calcium and magnesium in the water are exchanged with hydrogen ions, while anions such as chloride, sulphate and bicarbonate ions are exchanged with hydroxyl ions. In this way, the undesired ions are replaced by hydrogen and hydroxyl ions, which are the normal constituent ions of water.

An ion-exchange resin has a finite exchange capacity and becomes exhausted when all of the hydrogen or hydroxyl ions have been exchanged. It is clearly desirable to know when the resin contained in the device has been exhausted. This can be determined by testing the treated water for ion concentration or conductivity although this may not be convenient having regard to practical considerations. It is preferable, therefore, to incorporate into the resin a colour indicator to show when the ion-exchange capacity has been exhausted. Since the exhaustion of a cation or anion exchange resin is accompanied by a change in pH of the resin, the resin can be rendered self-indicating by dyeing the resin beads with a colorimetric pH indicator. In a mixed-bed resin one or more of the component resins may be so dyed. Colorimetric pH indicators are well known and include, for example, thymol blue (blue to yellow colour change), litmus (blue to red colour change), methyl red (red to yellow colour change) and bromothymol blue (yellow to blue colour change).

A variety of different types of ion-exchange resins are suitable for use in the water treatment device according to the present invention. In particular however, when the deionised water is to be used for chemical testing purposes, as battery top-up water or for filling steam irons, the resin is preferably of a mixed-bed strong cation/strong anion type so as to yield a product which is substantially free of ions of both types. Preferably the resin is of the above self-indicating type, so that the device and resin may be used several or many times and will undergo a colour charge when its ion-exchanging capacity is exhausted. Suitable commercially available ion-exchange resins fulfilling the foregoing requirements include the products sold by Rohm and Haas under the trade names AMBERLITE MB-8 (which is non-self-indicating), AMBERLITE MB-13 and AMBERLITE MB-6113.

As already stated, the quantity of ion-exchange resin within the water-tight, flexible container is such as occupies only a minor proportion of the available interior volume of the container. For example, the volume of resin may amount to only one fifth or one tenth or less of the available interior volume of the container. Thus by using the resin several times, each time producing a container-full of deionised water, it is possible to produce in situ a quantity of deionised water which is many times the volume of the device itself.

To give an example, the volume of the container may be between 5 and 20 times the volume of the resin and the device may be used say between 5 and 20 times. Thus the volume of deionised water produced may then be between 25 and 400 times the volume of the resin used. Since the packed volume of the device may be little more than that of the resin within it, it is necessary to store and transport a device which is only a very small percentage, say 1 to 2%, of the volume of the water it is capable of producing.

The device according to the present invention is used by filling the container with mains or natural water and gently shaking for a period of time to allow contact between the ion-exchange resin and the water such that the process of deionisation takes place. The time of shaking is typically between two and ten minutes. After the period of shaking, the ion-exchange resin is allowed to settle within the container and the deionised water produced is poured from the container through the liquid aperture. The strainer prevents any particles of ion-exchange resin being lost from the container.

The invention is illustrated by way of example in the accompanying drawings, which show one form of the device according to the present invention and wherein.

Figure 1:
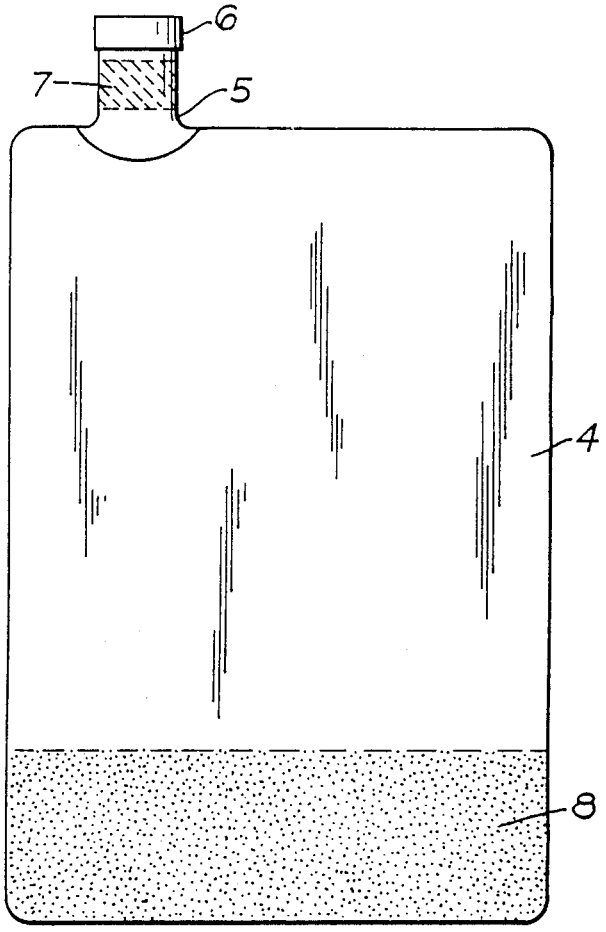
FIG. 1 is an elevation from the front of the device.
Figure 2:
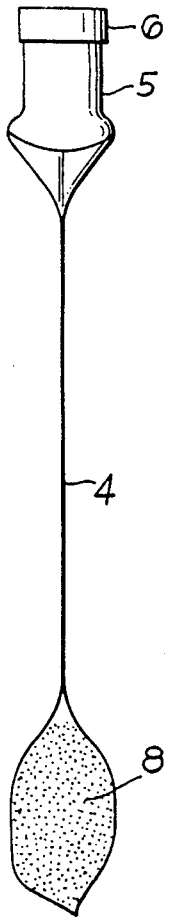
FIG. 2 is a side elevation of the device of FIG. 1.

The device illustrated in the drawings is a flexible envelope 4 of polyester film of dimension 145 mm by 180 mm, with a polyethylene pouring spout 5 bonded thereto. The maximum internal volume of the envelope is 500 ml. The spout is provided with a snap-on polythene closure cap 6. Within the spout is a strainer 7 of glass wool.

50 ml or 100 ml of a self-indicating mixed-bed ion-exchange resin 8 is contained in the envelope 4. The resin is typically a mixture of a strongly acidic cation exchange resin in the hydrogen ion form with a colour-dyed acrylic anion exchange resin in the regenerated hydroxy form.

Figure 3:
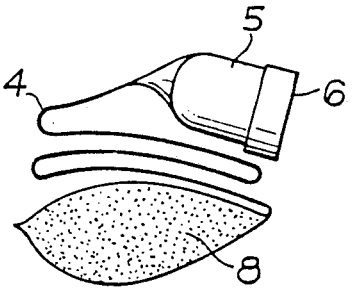
FIG. 3 shows the device in side elevation in a folded condition for storage or transport.

When the whole envelope containing the resin was folded as shown in FIG. 3 and placed in a protective outer carton, its total volume was approximately 100 ml. It will readily be understood, as will be illustrated in Examples hereinafter, that this compact device may be used to produce total quantities of deionised water amounting to many times its packed volume.

One of the many situations in which deionised water is required, often in remote locations where it is not readily available, is in the analysis of soils. Soil analysis may be carried out for a variety of reasons, for example to assess fertiliser requirements or for environmental control or ground surveys. Laboratory testing procedures for soil are difficult to reproduce in field conditions and therefore it is desirable to devise simple methods of testing for such latter purposes.

Soil testing requires two stages, first of all the extracting from the soil of the chemicals to be subjected to testing and secondly the analysis of the extracted chemicals. The extracting is carried out by shaking the soil with an aqueous solution containing one or more extracting chemicals. The extracting chemicals employed depending on the particular soil test being carried out. Ordinarily these soil extraction systems are sold either as ready-made soil extraction solutions which are bulky and difficult to carry, or as a powder or concentrated chemical solution which must be made up or diluted with deionised or distilled water. The principle disadvantage of the latter is that the soutions are subject to error due to inaccuracies in weighing out or measuring the powders or concentrated solutions in the field. If, however, the soil extracting chemicals are provided in predetermined amounts, for example in tablet form, then the required extracting solutions may readily be prepared by dissolving these amounts in a measured volume of deionised water. By means of the present invention, the necessity deionised water may be prepared in situ.

Thus the present invention includes a soil extraction outfit comprising a water treatment device as described above in combination with one or more soil extraction chemicals in predetermined amounts, for example as tablets. Using this outfit, which may be produced in an extremely compact form which is easy to store and to carry, soil extractions may be carried out in the field at any site where a source of mains or natural water is available.

The soil extraction chemicals used may be any of those products which, in the form of solutions, are already used for the purpose. They include, individually and in mixtures, potassium chloride, sodium bicarbonate and ethylenediamine tetra-acetic acid and its salts.

Having carried out soil extraction, it is necessary to subject the extract to chemical analysis, the particular analysis required depending on the parameter under test. Chemical tests conventionally carried out on soil include those for nitrate nitrogen, phosphate, potassium, calcium, magnesium, iron, copper, manganese and ammonium nitrogen. Such tests can be carried out by standard laboratory methods of analysis. However for field use it is desirable for the test reagents to be provided in a simplified form.

A particularly convenient form is to provide the test reagents in the form of composite tablets, each tablet containing the necessary chemical reagents required for a particular test. For certain tests the reagents may be provided in the form of a single tablet; for other tests they may be provided by two or more tablets. Such tablets are already established in the water testing market and are sold under the Registered Trade Mark PALINTEST.

Thus one particularly advantageous form of the present invention is a soil testing outfit which comprises a water treatment device as described above, soil extraction chemicals in tablet form and test reagent chemicals also in tablet form. By means of such an outfit, soil testing can be carried out, in the laboratory or in the field, without the need for a supply of deionised or distilled water and without having to weigh out or measure standard laboratory chemicals.

The invention will now be further described by means of the following examples:

PRODUCTION OF DEIONISED WATER

Example 1

The device illustrated in the accompanying drawings was filled with 500 ml of a synthetically prepared hard water having a conductivity of 458 microsiemens, a calcium hardness of 200 mg/l as $CaCO_3$ and a total alkalinity of 150 mg/l as $CaCO_3$. The resin used in the device was 50 ml of AMBERLITE MB-8, a non-self-indicating mixed-bed resin comprising 40 percent by volume of a cation exchange resin in the hydrogen form and 60 percent by volume of an anion exchange resin in the hydroxyl form. The device was shaken gently for a period of several minutes. Conductivity readings were taken on the water at one-minute intervals in order to indicate the degree of deionisation which had taken place. The results are shown in the following table.

| Time (mins) | Conductivity (microsiemens) |
|---|---|
| initial | 458 |
| 1 | 195 |
| 2 | 78 |
| 3 | 28 |
| 4 | 8.9 |
| 5 | 3.0 |
| 6 | 1.0 |

At the end of a six-minute period the water had a conductivity of 1.0 microsiemens and a chemical analysis showed that the hardness was less than 1.0 mg/l as $CaCO_3$, indicating that complete deionisation of the water had effectively been carried out.

EXAMPLE 2

The device illustrated in the accompanying drawings was filled with 500 ml of mains water having a conductivity of 292 microsiemens and a harness of 125 mg/l $CaCO_3$. The resin used was 50 ml of AMBERLITE MB-11, a self-indicating mixed-bed resin comprising 65 percent by volume of a cation-exchange resin in the hydrogen form and 35 percent by volume of an anion-exchange resin in the free base form. The device was gently shaken over a period of time and samples were taken each minute for conductivity measurement. The results are shown in the table below.

| Time (mins) | Conductivity (microsiemens) |
|---|---|
| initial | 292 |
| 1 | 80 |
| 2 | 28 |
| 3 | 9.1 |
| 4 | 3.0 |
| 5 | 1.7 |
| 6 | 1.1 |

The resulting water had a conductivity of less than 1.0 microsiemens and a hardness of less than 1 mg/l $CaCo_3$, indicating that deionisation had taken place.

Example 3

A further device as illustrated in the accompanying drawings was filled with 500 ml of mains water having the same analysis as that described in Example 2. The resin used in the device was 50 ml of AMBERLITE MB-13, a self-indicating mixed-bed resin comprising 45 percent of a cation-exchange resin in the hydrogen form and 55 percent of an ion-exchange resin in the hydroxyl form. The device was shaken for a period of 5 minutes, after which time the water was poured into a separate container and the conductivity measured. The device was then refilled with a further 500 ml of mains water, shaken for a period of 5 minutes and the resulting water again poured into a separate container for conductivity measurement. The process was repeated with further 500 ml portions of mains water until conductivity measurements indicated that the ion-exchange capacity of the resin had been exhausted. The results are shown in the following table.

| Sample | Final Conductivity at 5 minutes |
|---|---|
| 1 | 1.3 |
| 2 | 1.5 |
| 3 | 1.2 |
| 4 | 2.1 |
| 5 | 1.0 |
| 6 | 2.4 |
| 7 | 1.3 |
| 8 | 1.5 |
| 9 | 1.3 |
| 10 | 1.2 |
| 11 | 2.0 |
| 12 | 5.2 |
| 13 | 21 |
| 14 | 47 |

The test results showed that the device could be used 12 times to produce deionised water of a satisfactory quality before the resin became exhausted. The volume of the deionised water produced was therefore some 120 times the volume of the ion-exchange resin, and some 60 times the packed volume of the illustrated device.

Example 4

A further device as illustrated in the accompanying drawings was filled with 500 ml of mains water having an initial total dissolved solids content of 208 mg/l. The resin used in the device was AMBERLITE MB-6113—a self-indicating mixed-bed resin comprising 40% by volume cation exchanger in the hydrogen form and 60% ion exchanger in the hydroxyl form. The device was shaken for a period of five minutes, after which the water was poured into a separate container and the total dissolved solids content analysed. The device was then allowed to stand containing the damp resin for a period of 24 hours and was then re-filled with a further 500 ml of mains water, shaken for a period of five minutes and the resulting water again poured out into a separate container for total dissolved solids analysis. This process was repeated every 24 hours until analysis of the water produced indicated that the ion-exchange capacity of the resin had been exhausted. The mains water used in the device was drawn from three different water sources in order to provide a range of initial total dissolved solids contents on which to test the device. The results are shown in the following table:

| Number of Uses | Total Dissolved Solid (mg/l) Initial | Final | % Ions Remaining in Treated Water | Ion-Exchanged Resin Colour | Cumulative Total Ions Removed (mg) |
|---|---|---|---|---|---|
| 1 | 208 | 0 | 0 | Green | 104 |
| 2 | 208 | 0 | 0 | Green | 208 |
| 3 | 210 | 1 | 0.5 | Green | 313 |
| 4 | 209 | 1 | 0.5 | Green | 417 |
| 5 | 211 | 1 | 0.5 | Green | 523 |
| 6 | 202 | 0 | 0 | Green | 624 |
| 7 | 212 | 0 | 0 | Green | 730 |
| 8 | 176 | 1 | 0.6 | Green | 818 |
| 9 | 203 | 1 | 0.5 | Green | 920 |
| 10 | 162 | 1 | 0.6 | Green | 1001 |
| 11 | 586 | 1 | 0.2 | Green | 1244 |
| 12 | 586 | 1 | 0.2 | Green | 1487 |
| 13 | 586 | 0 | 0 | Green | 1780 |
| 14 | 586 | 0 | 0 | Green | 2067 |
| 15 | 578 | 0 | 0 | Green | 2356 |
| 16 | 578 | 1 | 0.2 | Green | 2645 |
| 17 | 578 | 0 | 0 | Green | 2934 |
| 18 | 578 | 1 | 0.2 | Green/Brown | 3223 |
| 19 | 548 | 1 | 0.2 | Green/Brown | 3512 |
| 20 | 548 | 1 | 0.2 | Green/Brown | 3801 |
| 21 | 548 | 1 | 0.2 | Green/Brown | 4090 |
| 22 | 548 | 2 | 0.4 | Brown | 4379 |
| 23 | 560 | 6 | 1.1 | Brown | |
| 24 | 560 | 16 | 2.9 | Brown | |
| 25 | 560 | 31 | 5.5 | Brown | |
| 26 | 560 | 54 | 9.6 | Brown | |

The test result showed that the device could be used 22 times to produce deionised water of a satisfactory quality before the resin became exhausted. The initial green colour of the resin had turned completely brown at the point at which the ion-exchange capacity of the resin had been exhausted. The volume of deionised water produced was, therefore, some 110 times the volume of the ion-exchange resin, and some 50 times the packed volume of the illustrated device.

Soil Extraction

Example 5

Extraction tablets were prepared containing 185 mg ethylenediamine tetra-acetic acid (EDTA) disodium salt and 65 mg binders, lubricants, disintegrants and other tableting aids. Total weight of each tablet was 250 mg. A soil extraction outfit was constructed comprising 500 of these tablets together with a water treatment device as described in Examples 1 to 4. The total packed volume of the outfit was approximately 400 ml. The tablets were used at the rate of 5 tablets per 50 ml of deionised water to produce a soil extracting solution equivalent to 0.05 Molar EDTA solution. Soil extractions were carried out by shaking 10 ml of soil with 50 ml of this extracting solution. The soil extract so prepared was then filtered and subjected to chemical analysis.

Using locally-available mains or natural water, this pack is capable of producing a total of 5000 ml of soil extracting solution, sufficient for 100 individual soil extractions when used at the foregoing rate. This soil extraction outfit thus provides a compact and easy-to-carry soil extraction system having a packed volume of only 8 percent of that required for conventional ready-made-up soil extraction systems; or for soil extraction systems comprising separate chemicals supplied with a container of deionised or distilled water.

Soil Testing

Example 6

A soil testing outfit was constructed comprising 1000 soil extraction tablets, two water treatment devices as used in Examples 1 to 3, 50 each test reagent tablets and the test tubes, colour comparison charts and stirring rods necessary to carry out the tests. The reagent tablets contained in the outfit were those for the measurement of nitrate (3 types), phosphate (2 types), potassium, pH, lime requirement, calcium, magnesium, ammonia (2 types), aluminum (2 types), chloride, copper, iron, manganese, sulphate and zinc. The contents of the outfit were sufficient to carry out 100 individual soil extractions and 50 determinations of each of the following test parameters—nitrate nitrogen, phosphate, potassium, pH, lime requirement, magnesium, calcium, ammonia nitrogen, aluminium, chloride, copper, iron, manganese, sulphate and zinc. The test outfit was fitted into a carrying case having outer dimensions 36 by 30 by 18 cm. This outfit is capable of carrying out a total of 750 soil tests to be carried out other than a locally available supply of mains or natural water.

I claim:

1. A soil testing kit comprising, in combination:
   (a) a water-tight container formed of a flexible synthetic, collapsible plastic material which collapses on its own accord to a substantially flat configuration when empty;
   (b) said container having a liquid spout disposed at one end thereof, strainer means disposed within said spout, and a closure cap for said spout;
   (c) said container having a predetermined interior capacity and within said container and mixed together, an anion-exchange resin and a cation-exchange resin having a predetermined total combined volume that occupies a minor proportion of the interior capacity of said container;
   (d) a first predetermined amount of soil extraction chemicals [in said container], and
   (e) a second predetermined amount of soil analysis reagents [in said container].

2. The soil testing kit of claim 1, wherein the combined volume of the resins in said container is less than one fifth the interior capacity of the container.

3. The soil testing kit of claim 2, wherein the soil-extraction compound is at least one compound selected from the group consisting of potassium chloride, sodium bicarbonate, ethylenediamine tetraacetic acid and salts of ethylenediamine tetraacetic acid.

4. The soil testing kit of claim 2, wherein the soil analysis reagents comprise reagents for testing one or more ions selected from the group consisting of nitrate nitrogen, phosphate, potassium, calcium, magnesium, iron, copper, manganese and ammonium nitrogen.

5. The soil testing kit of claim 1, wherein the water-tight container is made from a synthetic plastic material selected from the group consisting of polyethylene, polyester, or nylon.

6. The soil testing kit of claim 1, wherein the strainer means are selected from the group consisting of flat mesh, perforated plate, a plug of fibrous material, and a plug of filamentary material.

7. The soil testing kit of claim 1, wherein the anion exchange resin is a high molecular weight polymer containing basic groups selected from the group consisting of quaternary ammonia, and amino groups.

8. The soil testing kit of claim 1, wherein the cation exchange resin is a high molecular weight polymer containing acid groups selected from the group consisting of sulphonic, and carboxylic groups.

9. The soil testing kit of claim 1, wherein the mixed resin includes a color indicator to show when the ion exchange capacity has been exhausted.

10. The soil testing kit of claim 1, wherein the soil extraction chemicals are in tablet form.

11. The soil testing kit of claim 1, wherein the soil analysis reagents are in tablet form.

* * * * *